United States Patent [19]

Ichikawa

[11] 3,818,309

[45] June 18, 1974

[54] DC TRANSFORMER

[76] Inventor: Masahide Ichikawa, No. 13-11 Honjo 1-chome, Tokyo, Japan 130

[22] Filed: Aug. 28, 1972

[21] Appl. No.: 284,369

[30] Foreign Application Priority Data

| | | |
|---|---|---|
| Sept. 21, 1971 | Japan | 46-73715 |
| Sept. 21, 1971 | Japan | 46-73716 |
| Oct. 15, 1971 | Japan | 46-81429 |

[52] U.S. Cl. .................. 321/15, 307/110

[51] Int. Cl. .................. H02m 7/00

[58] Field of Search .................. 307/109, 110; 321/15

[56] References Cited

UNITED STATES PATENTS

| | | | |
|---|---|---|---|
| 3,111,594 | 11/1963 | Stolte | 307/110 |
| 3,477,011 | 11/1969 | Westwood | 321/15 |
| 3,505,586 | 4/1970 | Dulin | 321/15 |
| 3,553,479 | 1/1971 | Nelson | 307/110 |
| 3,646,425 | 2/1972 | Beck et al. | 321/15 |

*Primary Examiner*—William M. Shoop, Jr.

*Attorney, Agent, or Firm*—McGlew and Tuttle

[57] ABSTRACT

A DC transformer converts DC voltage by employing multiple charging circuits formed by connecting charging semiconductor elements, such as diodes and thyristors, in series to opposite ends of a condenser, and DC low voltage is applied to opposite input terminals of all the charging circuits connected in parallel to each other. The condensers of all the charging circuits are connected in series with each other between a pair of output load terminals. Gating circuit means are operable to trigger conductive both semiconductor devices of each charging circuit to charge the associated condenser to the voltage of a low voltage source and, with all condensers charged to the voltage of the source, to impress the sum of the voltages of all condensers between the output load terminals. In the first embodiment of the invention, the charging circuits are gated conductive in succession. In a second embodiment of the invention, respective semi-conductor devices, each having a gating electrode, are connected in series between each pair of condensers. The charging circuits are gated conductive simultaneously in alternation with the gating conductive of all of the semi-conductor devices connected in series between pairs of condensers. In a third embodiment of the invention, the charging circuits are arranged to form sets of basic voltage transformation circuits and the application of gating current to the discharging semi-conductor elements is delayed by a slight amount.

9 Claims, 11 Drawing Figures

PATENTED JUN 18 1974

3,818,309

DC TRANSFORMER

FIELD AND SUMMARY OF THE INVENTION

This invention relates to a DC transformer which converts DC voltage by employing a condenser.

According to the principal features, based on three examples of a DC transformer, in the present invention, multiple charging circuits are formed by connecting charging semiconductor elements such as diodes and thyristors, in series to opposite ends of a condenser, and DC low voltage is applied to opposite input terminals of all the charging circuits connected in parallel with each other. Furthermore, in Example 1, the condensers of all the charging circuits are connected in series with each other between a pair of output load terminals, so that a load may be connected across the output terminals, and the charging circuits are energized successively by applying gate current to both semiconductor elements in each charging circuit. In Example 2, the condensers of all the charging circuits are connected in series, and discharging semiconductor elements, such as diodes and thyristors, are interposed between successive condensers connected in series between a pair of output load terminals. The charging semi-conductor elements and the discharging semiconductor elements are energized in alternation by applying gate current alternately thereto. In Example 3, the condensers of all the charging circuits are connected in series, and discharging semiconductor elements such as diodes and thyristors, are interposed between sucessive condensers to form plural sets of basic voltage transformation circuits, the opposite terminals of which are connected in parallel to the load. The charging semiconductor elements and the discharging semiconductor elements in the basic voltage transformation circuits are energized in alternation by applying gate current alternately thereto. The applying of gate current to said discharging semiconductor elements is delayed a slight amount alternately.

For an understanding of the principles of the invention, reference is made to the following description of typical embodiments thereof as illustrated in the accompanying drawings.

DESCRIPTION OF PREFERRED EMBODIMENTS

EXAMPLE 1.

Figure 1:
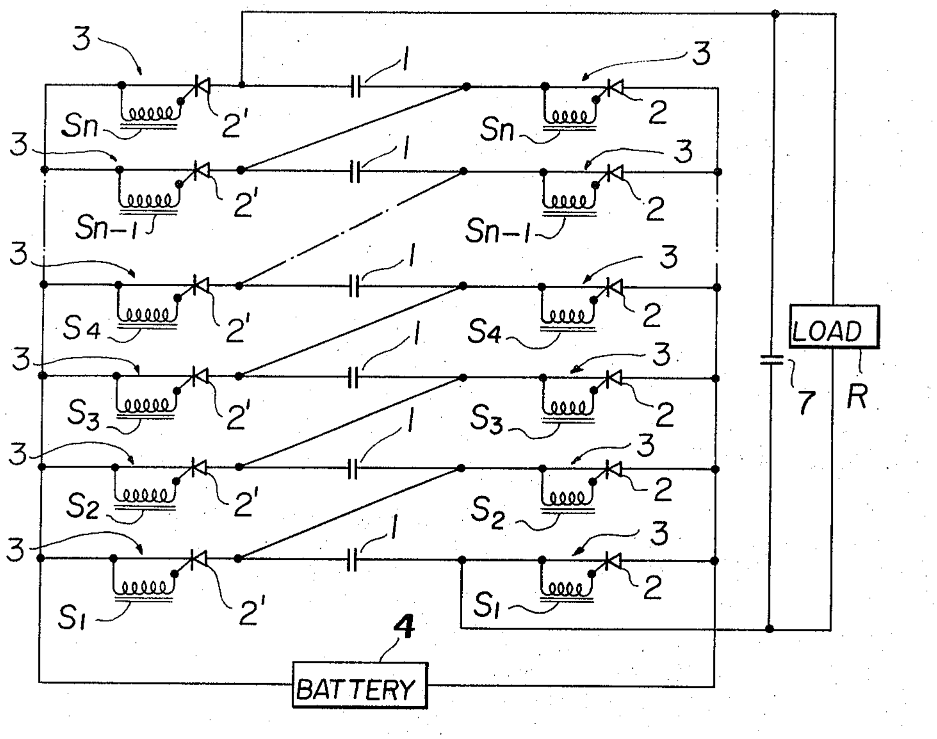
FIG. 1 is a schematic circuit diagram of a first embodiment of the invention.
Figure 2:
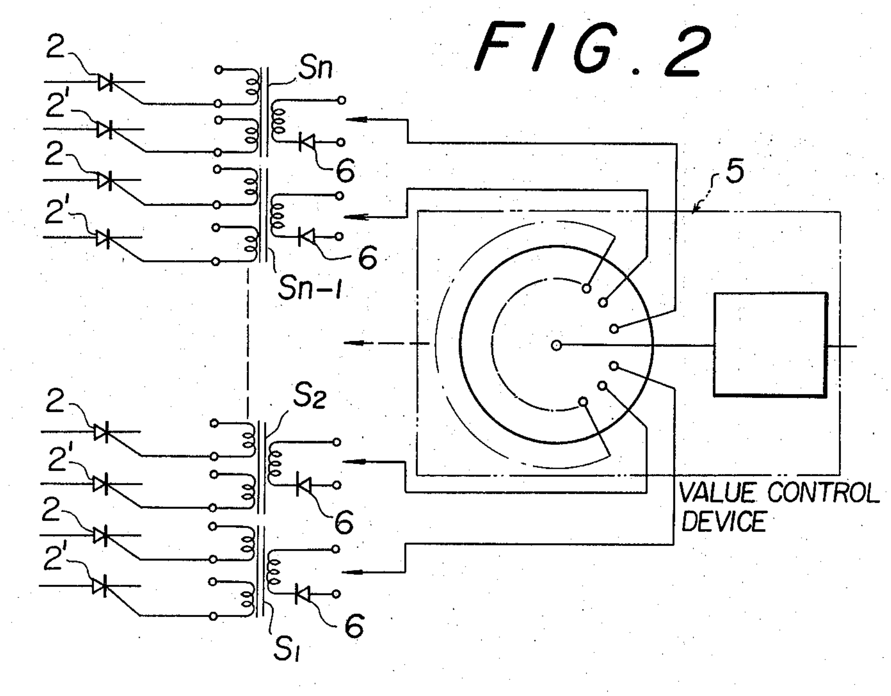
FIG. 2 is a schematic circuit diagram illustrating the gating of the semi-conductor charging device.
Figure 3:
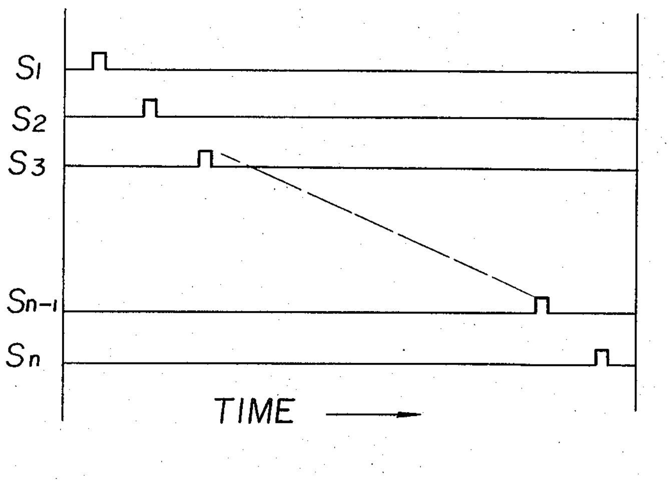
FIG. 3 diagrammatically illustrates the pulse sequence provided by the arrangement shown in FIG. 2.

As shown in FIG. 1, in the complete circuit of the DC transformer, each charging circuit (3) is formed by connecting thyristors (2)(2′) in series to opposite ends of a condenser (1), and the plural charging circuits (3) are connected, in parallel with each other, to opposite terminals of a battery (4). Moreover, all the condensers (1) in the charging circuits (3) are connected in series with each other and the load (R) is connected to opposite output terminals of the resulting series circuit. Furthermore, as shown in the schematic circuit diagram of the drive pulse originating area in FIG. 2, the condensers (1) are made to store electricity successively be connecting the gate terminals of the two thyristors (2)(2′) in each charging circuit (3) to corresponding polarity terminals of secondary windings of respective pulse transformers $(S_1)(S_2) \ldots (S_{n-1})(S_n)$ and by applying synchronous pulses provided by the value control device (5) successively to the primary winding of each pulse transformer $(S_1)(S_2) \ldots (S_{n-1})(S_n)$ through the diode (6). The wave form of the pulse supplied to each pulse transformer is shown in FIG. 3.

As described above, in this example multiple charging circuits are formed by connecting semiconductor elements, such as thyristors, in series to opposite ends of the condenser, and DC low voltage is applied to opposite input terminals of the charging circuits, which latter are connected in parallel with each other. Moreover, the condensers of all the charging circuits are connected in series with each other so that the load may be connected to opposite output terminals of the resultant series circuit. The semiconductor elements of the charging circuits are energized successively by applying gate current simultaneously to both semiconductor elements in each charging circuit. Accordingly, when both semi-conductor elements in each charging circuit are energized by applying gate current, the condensers are energized by DC low voltage applied and store electricity successively at the same electric potential with DC low voltage. When the storing of electricity of all the condensers is completed, all the condensers become electrically in a serial state, and the accumulated charge is discharged at once to the load, transforming DC low voltage to DC high voltage.

EXAMPLE 2.

Figure 5:
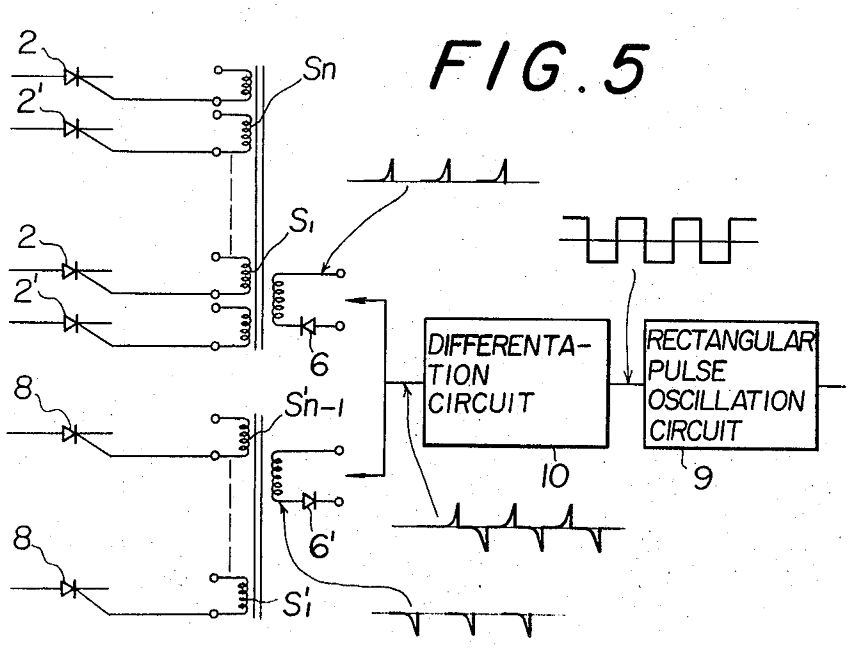
FIG. 5 is a schematic wiring diagram illustrating the application of gating pulses alternately to the charging semi-conductor devices and the discharging semiconductor devices.
Figure 4:
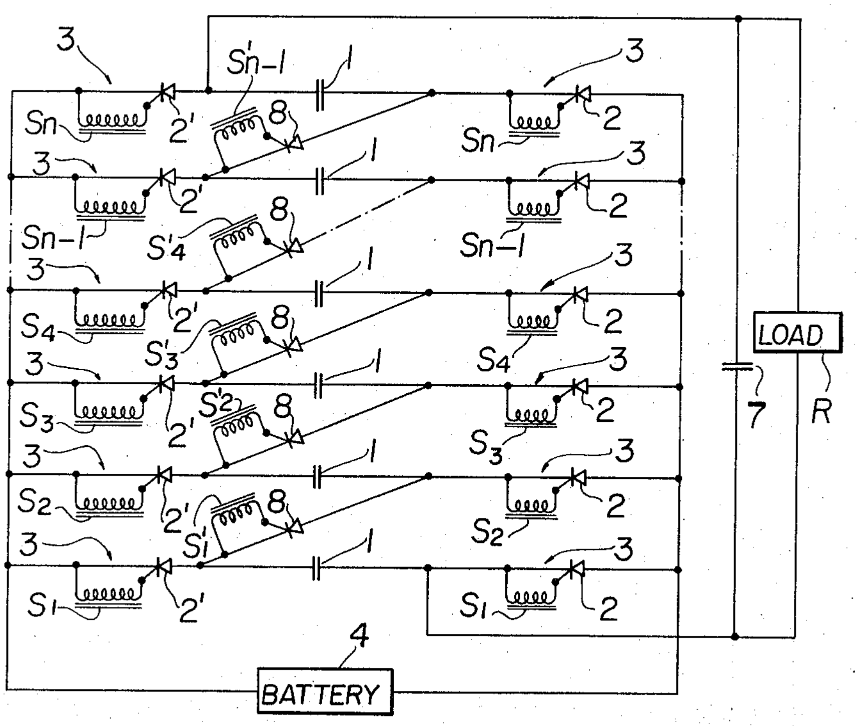
FIG. 4 is a schematic wiring diagram of a second embodiment of the invention.
Figure 6:
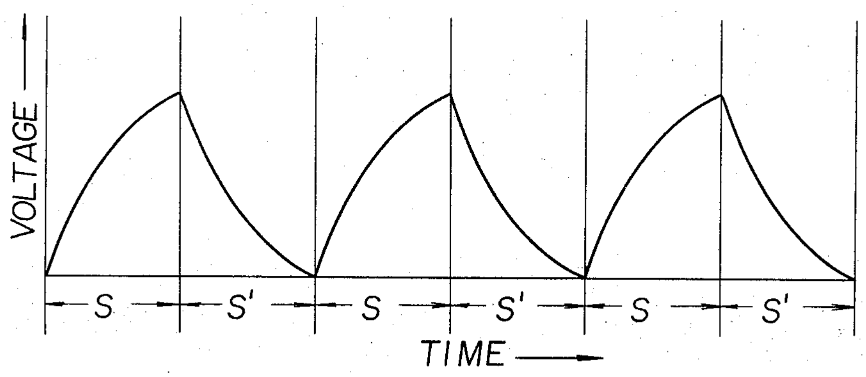
FIG. 6 is a diagrammatic illustration of the output voltage, with respect to time, of the embodiment of the invention shown in FIG. 4.

The complete circuit diagram of a DC transformer in this example is shown in FIG. 4, and the schematic circuit diagram of the drive pulse originating area in FIG. 5. The charging circuits (3) are formed by connecting charging thyristors (2)(2′) in series to opposite ends of each condenser (1), and plural charging circuits (3)

are all connected in parallel with each other to opposite terminals of the battery (4). The condensers (1) of the charging circuits are all connected in series by means of discharging thyristors (8) interposed between them, and the load (R) is connected to opposite output terminals of the series circuit. The gate terminals of charging thyristors (2)(2') are connected to corresponding polarity terminals of secondary windings of the pulse transformers $(S_1)(S_2) \ldots (S_{n-1})(S_n)$. In the same way, the gate terminals of discharging thyristors (8) are connected to the secondary windings of the pulse transformers $(S'_1)(S'_2) \ldots (S'_{n-1})$. The primary windings of the pulse transformers have applied thereto, in alternation the alternating positive and negative spike-type pulse current produced by the rectangular pulse oscillation circuit (9) and the differentiation circuit (10) by means of the reversely connected (6)(6') disposed reversely. When the positive portion of spike-type pulse current excites the pulse transformers $(S_1)(S_2) \ldots (S_{n-1})(S_n)$, gate current flows to the charging thyristors (2)(2') and triggers conductive the charging thyristors (2)(2'). Accordingly, if the battery (4) is 2V, each condenser is charged to a potential of 2V. When the negative portion of spike-type pulse current excites the pulse transformers $(S'_1)(S'_2) \ldots (S'_{n-1})$, gate current flows to the discharging thyristors (8) and triggers conductive the discharging thyristors (8). Accordingly, all the condensers (1), charged to a potential of $2V$, are simultaneously discharged to provide an output voltage on $n$ times $2V$, where $n$ is the number of charging circuits. This output voltage is supplied to the load connected across the output terminals of the series circuit. The characteristic diagram of voltage in this example is shown in FIG. 6.

As described above, in this example multiple charging circuits are formed by connecting charging semiconductor elements, such as thyristors, in series to opposite ends of each condenser, and DC low voltage is applied to the input terminals of the charging circuits connected to each other in parallel. Moreover, the condensers of all the charging circuits are connected in series by means of the discharging semiconductor elements, such as thyristors, interposed between them so that the load may be connected to the output terminals of the series circuit. The charging semiconductor elements and the discharging elements are alternately triggered conductive by applying gate currents alternately thereto.

EXAMPLE 3.

Figure 7:
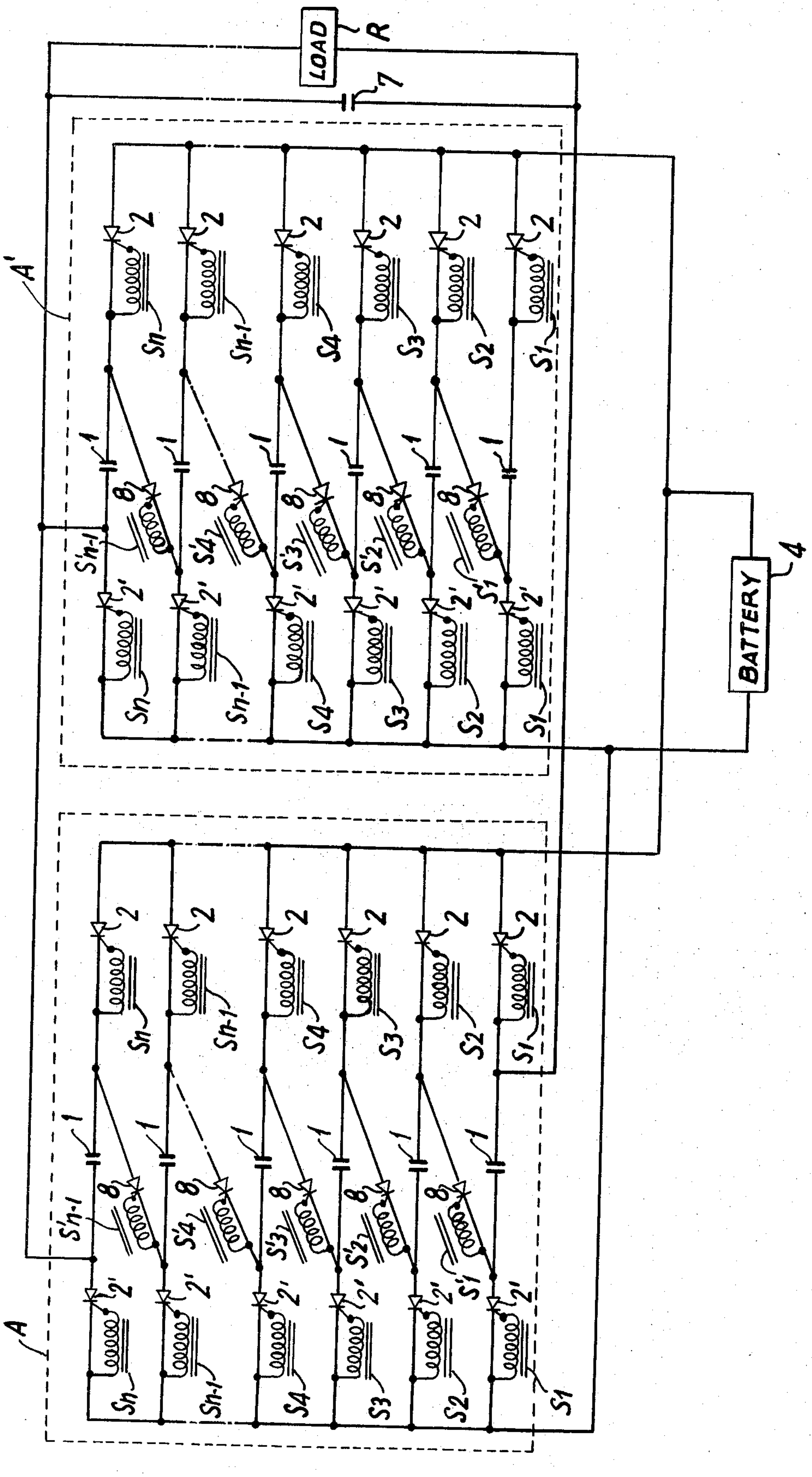
FIG. 7 is a schematic block and wiring diagram illustrating a third embodiment of the invention.
Figure 8:
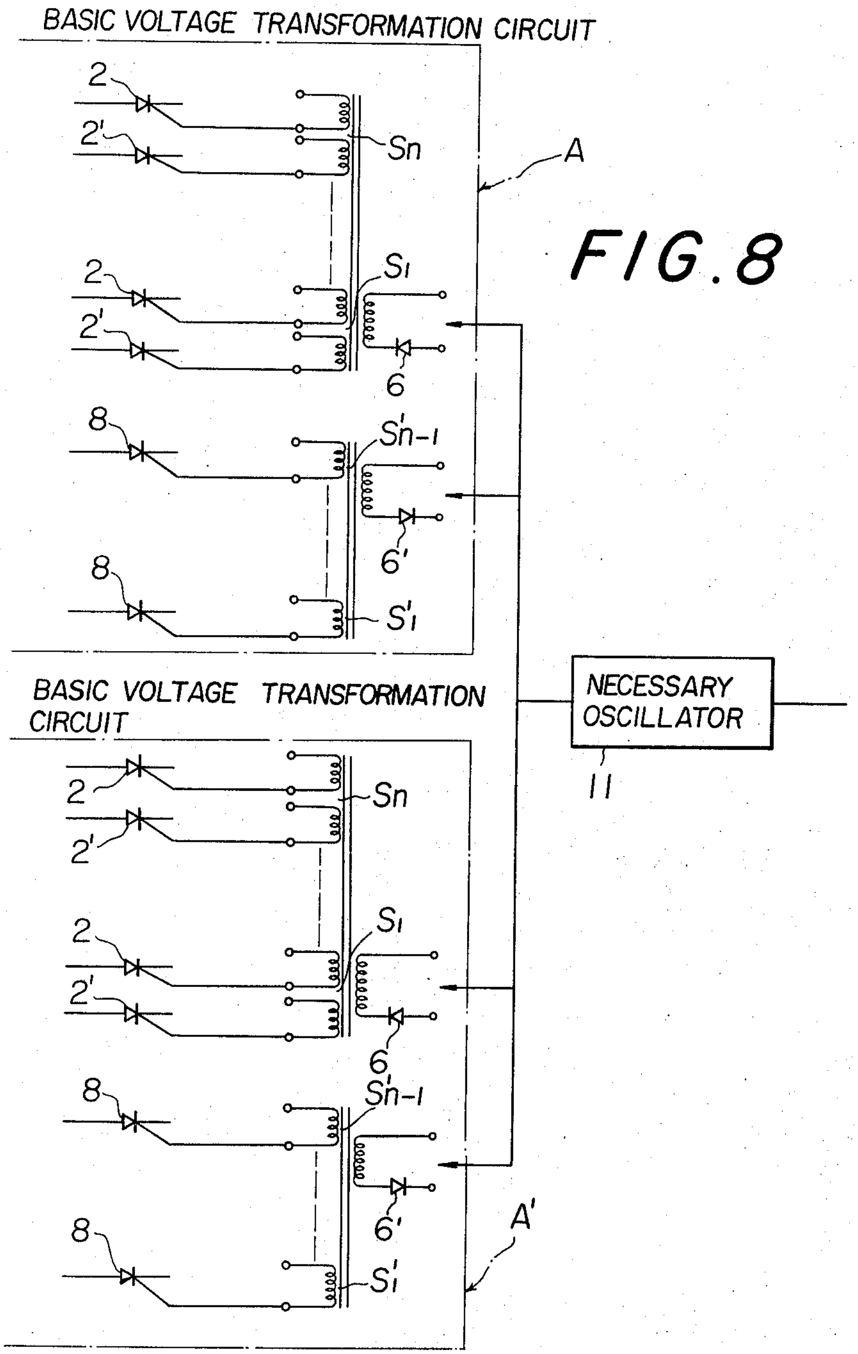
FIG. 8 is a schematic wiring diagram of the gating circuit for the embodiment of the invention shown in FIG. 7.

The complete circuit diagram in this example is shown in FIG. 7 and the connection diagram between the pulse transformer and the thyristor in FIG. 8, in which plural sets of basic voltage transformation circuits in Example 2 are connected each other in parallel and load is connected to the common output terminals. More particularly, plural sets of charging circuits (3) are formed by connecting the charging thyristors (2)(2') to opposite ends of each condenser (1), and all of the condensers are connected in series with each other by means of the discharging thyristors interposed between them, forming two sets of basic voltage transformation circuits (A)(A'). Corresponding input and output terminals of these basic voltage transformation circuits (A)(A') are connected in parallel with each other and the load (R) is connected to them. Moreover, the gate terminals of the charging thyristors (2)(2') in the basic voltage transformation circuits (A)(A') are connected to the secondary windings of the pulse tranformers $\{(S_1)_A, (S_2)_A, \ldots (S_n{}^-{}_1)_A, (S_n)_A\}$, $\{(S_1)_{A'}, (S_2)_{A'}, \ldots (S_{n-1})_{A'}, (SN)_{A'}\}$ and the gate terminals of the discharging thyristor (8) to the secondary windings of the pulse transformer $\{(S'_1)_A, (S'_2)_A, \ldots (S'_{n-1})_A, (S'_1)_A\}$, $\{(S'_2)_{A'}, \ldots (S'_{n-1})_{A'}\}$. The primary windings of these four pulse transformers $(S_1)_A \ldots, (S_1)_{A'} \ldots, S'_1)_A \ldots, (S'_1)_{A'} \ldots$ have applied thereto the alternating positive and negative spikes of the spike-type pulse current of an oscillator (11), so that transformers $(S_1)_A(S_1)_{A'}$ are energized in alternation with transformers $(S'_1)_A(S'_1)_{A'}$ and transformers $(S'_1)_A$ with transformers $(S'_1)_{A'}$. When the pulse transformers $(S_1)_A(S_1)_{A'}$ are excited, gate current flows to the charging thyristors (2)(2') and triggers them conductive. Accordingly, if the battery (4) is 2V, each condenser (1) is charged to a potential of 2V. When the pulse transformers $(S'_1)_A(S'_1)_{A'}$ are excited, gate current flows to the discharging thyristors (8) and triggers them conductive. That is to say, all the condensers (1), charged as mentioned above, are discharged simultaneously to provide an output or load voltage as high as $n$ times $2V$ ($n$ is the number of sets of charging circuit in the basic voltage transformation circuit.) which has few ripples.

As described above, in this example charging circuits are formed by connecting charging semiconductor elements, such as thyristors in series to opposite ends of each condenser, and DC low voltage is applied to the opposite ends of all the charging circuits connected in parallel with each other. Moreover, condensers of all the charging circuits are connected in series with each other by means of the discharging semiconductor elements interposed between them so that plural sets of the voltage transformation circuit are formed. Corresponding input and output terminals of these voltage transformation circuits are connected in parallel with each other and the circuits are connected in parallel to the load. The charging semiconductor elements and the discharging semiconductor elements in the voltage transformation circuits are alternately energized by applying gate current thereto, the applying of gate current to the discharging semiconductor elements being delayed a slight amount alternately to make this example characterized by the supply of DC current having few ripples to the load.

As shown in three examples described above, a DC transformer in the present invention operates not mechanically but entirely electrically, so that it has no trouble such as poor contact, operates very smoothly, and is durable for a long-term use. Furthermore, DC high voltage can be obtained from opposite terminals of the condensers connected in series by applying DC low voltage to opposite terminals of the charging circuits connected in parallel, and reversely DC low voltage from opposite terminals of the charging circuits connected in parallel by applying DC high voltage to opposite terminals of the condensers connected in series, making it possible to use the transformer both for raising the voltage and reducing the voltage.

Figure 9:
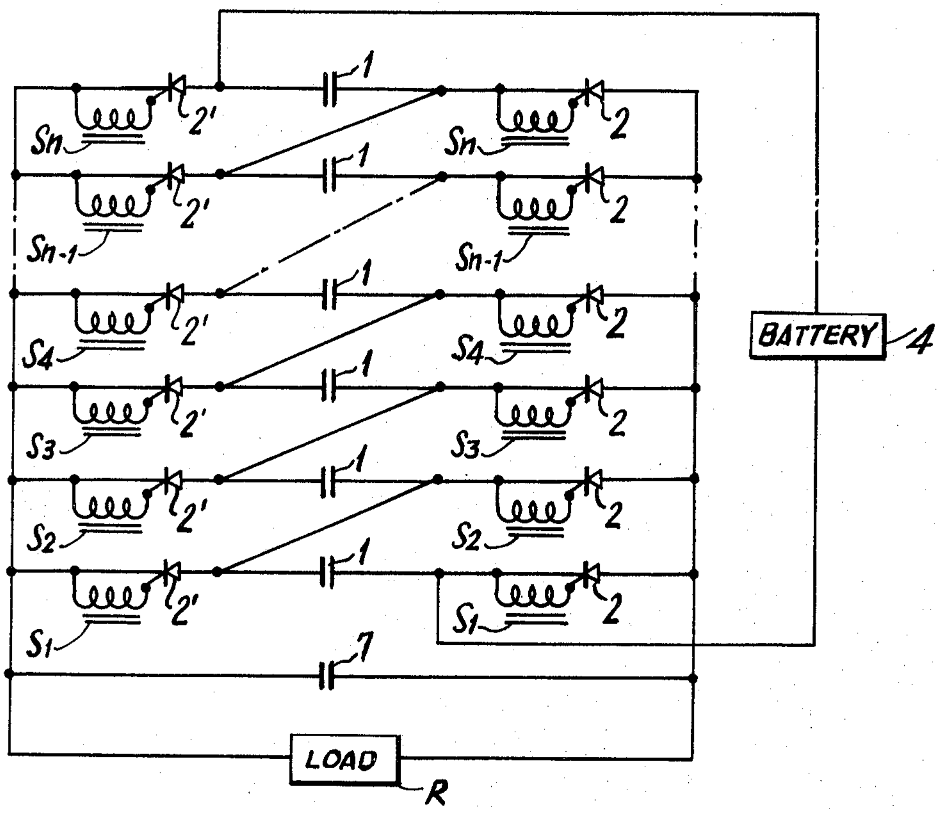
FIG. 9 is a schematic circuit diagram illustrating the first embodiment of the invention as connected to form a step-down voltage transformation device.
Figure 10:
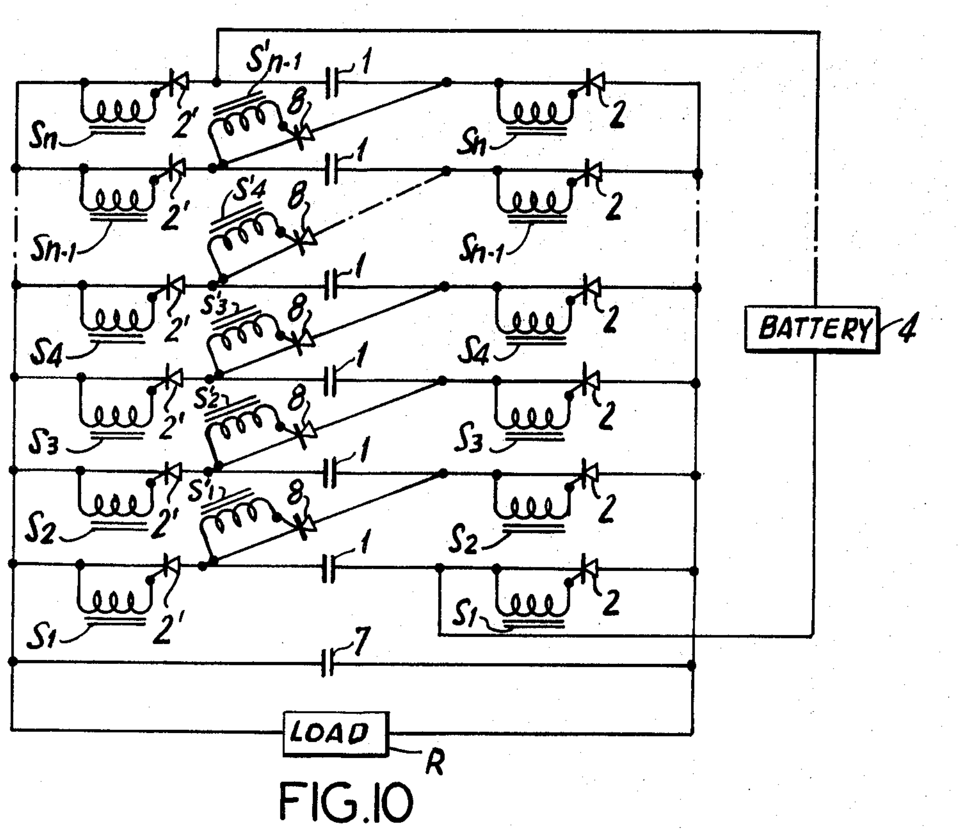
FIG. 10 is a schematic wiring diagram illustrating the circuit of the second embodiment, shown in FIG. 4, as connected to form a step-down voltage transformation device.
Figure 11:
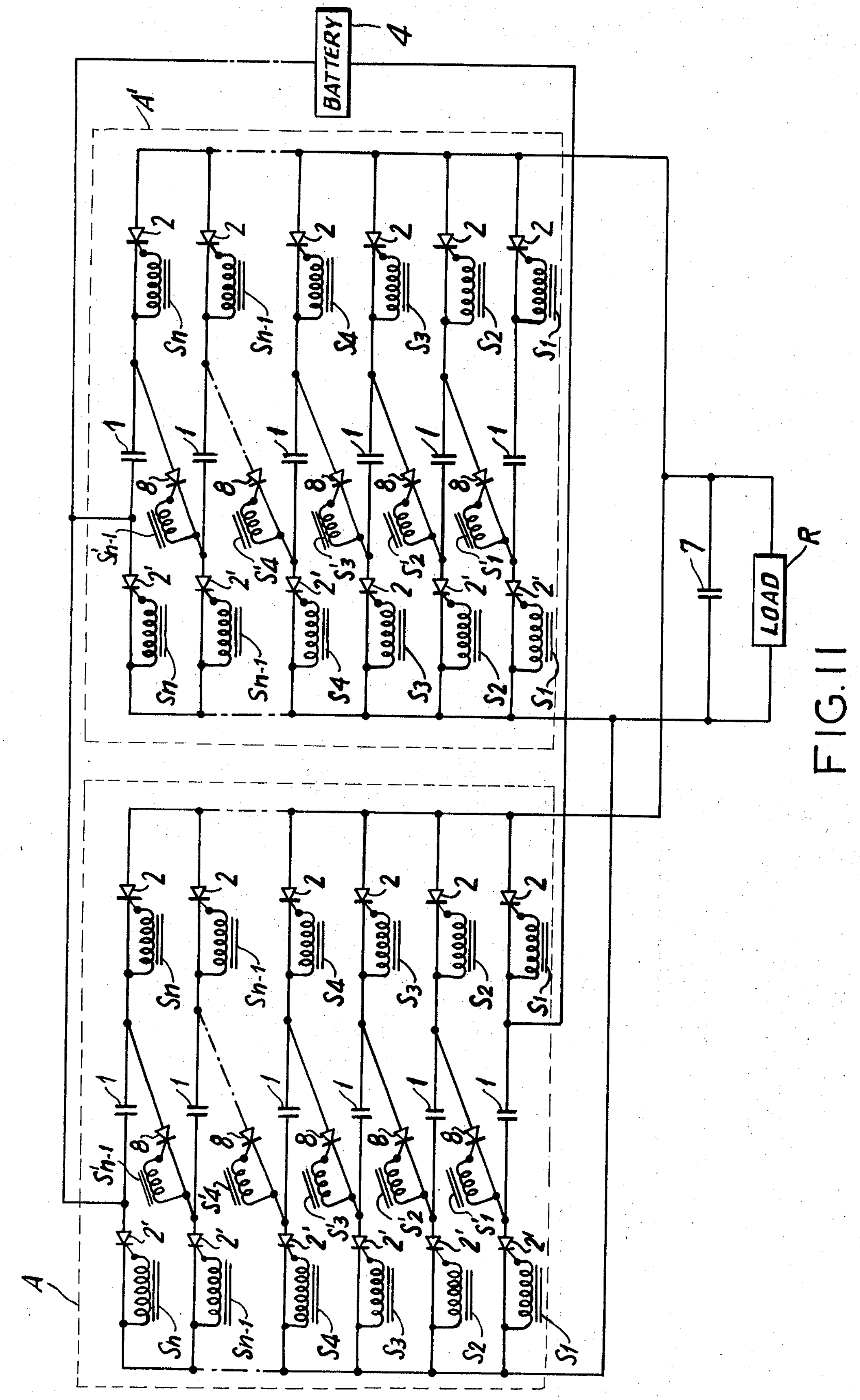
FIG. 11 is a schematic wiring diagram illustrating the circuitry of FIG. 7 as connected to form a step-down voltage transformation device.

Moreover, a DC transformer in accordance with the present invention can be used as a voltage dividing rectifier to obtain direct current equal to $1/n$ the voltage of a charging source. This is effected, with respect to the circuits previously described, by simply interchanging the LOAD and the BATTERY, with the circuit connections otherwise being the same or, alternatively, substituting, for the battery, an AC power source connected to the circuit through thyristors, whereby the present invention may be used as a type of voltage reducing rectifier. FIGS. 9, 10 and 11 illustrate the circuits of FIGS. 1, 4 and 7 as rearranged with the LOAD and the BATTERY interchanged.

Referring first of FIG. 9, when the battery 4 and the load R of FIG. 1 are interchanged, $1/n$ the voltage of the source is charged to each condenser. When the gate currents are applied to the semi-conductors 2 and 2', these semi-conductors become conductive and $1/n$ of the source voltage is supplied to the load R.

In FIG. 10, the load R and the battery 4 are again interchanged and, when the gate current is supplied to semi-conductors 8, these become conductive to charge each condenser to $1/n$ of the source voltage, at which time the semi-conductors 2 and 2' are non-conductive. When condensers 1 have been completely charged, gate currents are supplied to semi-conductors 2 and 2' to trigger them conductive. As a result, a voltage which is $1/n$ the voltage of the source is supplied to load R and, at this time, semi-conductors 8 are non-conductive.

An analogous operation occurs with respect to FIG. 11, and it is believed that further description will not be necessary.

In each of the embodiments shown in FIGS. 1, 4 and 7, a condenser 7 is connected in parallel with the load R.

While specific embodiments of the invention have been shown and described in detail to illustrate the application of the principles of the invention, it will be understood that the invention may be embodied otherwise without departing from such principles.

What is claimed is:

1. A DC transformer comprising, in combination, a plurality of charging circuits each having a pair of opposite terminals, each circuit including, between its opposite terminals, a condenser connected in series between a pair of charging semi-conductor devices each having a gating electrode; circuit means connecting corresponding terminals of all said charging circuits in parallel with each other to a pair of first terminals of said transformer; means connecting all said condensers in series with each other between a pair of second terminals of said transformer; and gating circuit means operable to trigger conductive both semi-conductor devices of each charging circuit simultaneously to charge the associated condensers to equal potentials responsive to connection of a low voltage DC source to said first terminals to impress the sum of the voltages of all said condensers between said second terminals and, responsive to connection of a high voltage DC source to said second terminals, to impress the common potential of all said condensers between said first terminals.

2. A DC transformer, as claimed in claim 1, in which said semi-conductor devices are thyristors.

3. A DC transformer, as claimed in claim 1, in which said gating circuit means includes a plurality of first transformers each having a primary winding and a pair of secondary windings; the gating electrodes of the two charging semi-conductor devices in each charging circuit being connected to corresponding polarity terminals of the two secondary windings of a respective first transformer; said gating circuit means further including means operable to apply polarized energizing pulses to the primary windings of said first transformers.

4. A DC transformer, as claimed in claim 3, in which said last named means comprises a control device operable to apply polarized energizing pulses successively and sequentially to the primary windings of said first transformers.

5. A DC transformer, as claimed in claim 1, including a plurality of discharging semi-conductor devices each having a gating electrode; each discharging device being connected in series between a respective pair of serially adjacent condensers whereby said condensers are connected in series through said discharging devices; said gating circuit means alternately triggering conductive all of said charging devices simultaneously and all of said discharging devices simultaneously.

6. A DC transformer, as claimed in claim 5, in which said gating circuit means comprises first transformer means including first primary winding means and a plurality of pairs of first secondary windings equal in number to the number of said charging circuits; the gating electrodes of the two charging semi-conductor devices of each discharge circuit being connected to corresponding polarity terminals of a respective pair of first secondary windings; said gating circuit means further including second transformer means including second primary winding means and a plurality of second secondary windings equal in number to said discharging semi-conductor devices; the gating electrodes of said discharging devices being connected to corresponding polarity terminals of respective second secondary windings; said gating circuit means further including means operable to supply polarized energizing pulses alternately to said first primary winding means and said second primary winding means.

7. A DC transformer, as claimed in claim 6, in which said gating circuit means includes a voltage generator having its output connected to both said first and said second primary winding means; said voltage generator producing an output voltage comprising alternating positive and negative pulses; one of said first and second primary winding means being polarized to be responsive only to positive pulses and the other thereof being polarized to be responsive only to negative pulses.

8. A DC transformer, as claimed in claim 7, in which said voltage generating means comprises an oscillation circuit; and a differentiation circuit connected to the output of said oscillation circuit and to said first and second primary winding means; said oscillation circuit producing alternating positive and negative square pulses and said differentiation circuit converting said square pulses into alternating positive and negative voltage spikes.

9. A DC transformer, as claimed in claim 5, constituting a first basic voltage transformation circuit; and at least one additional DC transformer, as claimed in claim 5, constituting an additional basic voltage transformation circuit; the first terminals of said basic voltage transformation circuits being connected in parallel with each other and the second terminals of said basic voltage transformation circuits also being connected in parallel with each other; said gating circuit means slightly delaying the gating conductive of said discharging semi-conductor devices.

* * * * *